(12) United States Patent
Davis

(10) Patent No.: US 6,601,540 B1
(45) Date of Patent: Aug. 5, 2003

(54) ANIMAL RESTRAINT APPARATUS

(76) Inventor: Robert L. Davis, 2 Kenmore St., Rochester, NY (US) 14611

( * ) Notice: Subject to any disclaimer, the term of this patent is extended or adjusted under 35 U.S.C. 154(b) by 0 days.

(21) Appl. No.: 10/122,848

(22) Filed: Apr. 12, 2002

(51) Int. Cl.[7] .............................................. B60R 22/10
(52) U.S. Cl. ...................................................... 119/771
(58) Field of Search ................................. 119/771, 795

(56) References Cited

U.S. PATENT DOCUMENTS

| 3,310,034 | A | | 3/1967 | Dishart |
| 3,948,222 | A | | 4/1976 | Longshore et al. |
| D263,636 | S | | 3/1982 | Bassani |
| 4,324,204 | A | * | 4/1982 | Friedman ..................... 119/771 |
| 4,676,198 | A | * | 6/1987 | Murray ........................ 119/771 |
| 4,715,618 | A | | 12/1987 | Harris |
| 5,035,203 | A | | 7/1991 | Cardenas |
| 5,167,203 | A | * | 12/1992 | Scott et al. .................. 119/771 |
| 5,913,285 | A | * | 6/1999 | Pritchard ..................... 119/771 |
| 5,915,335 | A | | 6/1999 | Holt, Jr. |

* cited by examiner

Primary Examiner—Charles T. Jordan
Assistant Examiner—Bret Hayes

(57) ABSTRACT

A animal restraint apparatus for releasably securing a pet to a seatbelt of a vehicle. The animal restraint apparatus includes a flexible panel member that has a top end, a bottom end, a first side, and a second side. A plurality of elongate straps releasably attaches the panel member to the chest of the pet. Each of the straps has a first end and a second end. Each of the first ends is fixedly coupled to the first side of the panel member. A fastening means selectively couples the second ends of each of the straps to the second side of the panel member. A loop for removably receiving the seatbelt is attached to the front of the panel member.

8 Claims, 2 Drawing Sheets

ANIMAL RESTRAINT APPARATUS

BACKGROUND OF THE INVENTION

1. Field of the Invention

The present invention relates to pet restraints and more particularly pertains to a new animal restraint apparatus for releasably securing a pet to a seatbelt of a vehicle.

2. Description of the Prior Art

The use of pet restraints is known in the prior art. U.S. Pat. No. 5,035,203 describes a pet automobile safety harness. Another type of pet restraint is U.S. Pat. No. 5,915,335 is a dog car restraint.

While these devices fulfill their respective, particular objectives and requirements, the need remains for a device that is simple to secure to the pet while maintaining a high level of safety for the animal in the event of an accident.

SUMMARY OF THE INVENTION

The present invention meets the needs presented above by utilizing a simple but effective single panel design that incorporates fastening straps and a means by which the animal is actually harnessed in by the seatbelt rather that just attached to it.

Still yet another object of the present invention is to provide a new animal restraint apparatus that is comfortable for the animal to wear, making it less likely to fight being secured in, thereby lessening distractions to the driver.

Even still another object of the present invention is to provide a new animal restraint apparatus that, in the instance of an accident, would allow rescue workers to attend to any injured people without having to deal with a defensive animal if indeed the animal was in any condition to do so.

To this end, the present invention generally comprises a flexible panel member that has a top end, a bottom end, a first side, and a second side. A plurality of elongate straps releasably attaches the panel member to the chest of the pet. Each of the straps has a first end and a second end. Each of the first ends is fixedly coupled to the first side of the panel member. A fastening means selectively couples the second ends of each of the straps to the second side of the panel member. A loop for removably receiving the seatbelt is attached to the front of the panel member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
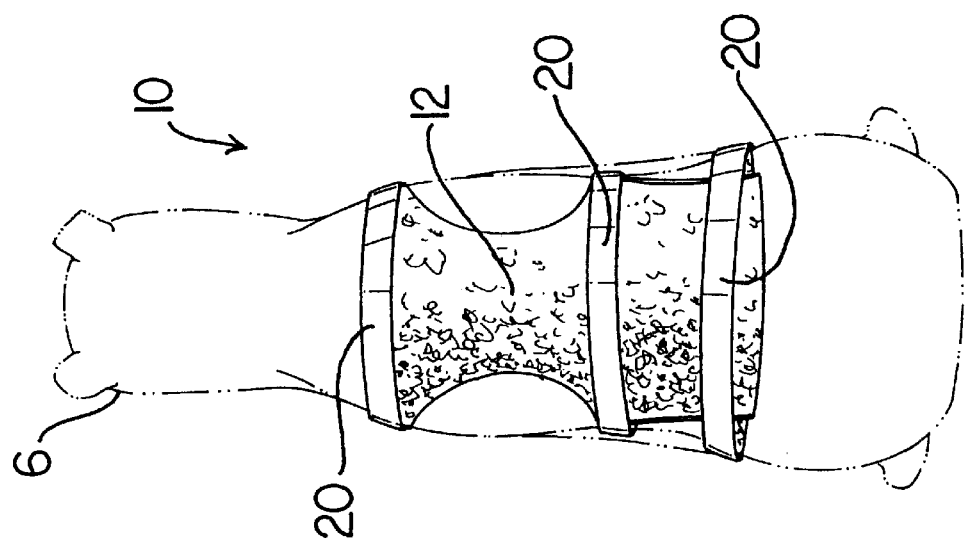
FIG. 2 is a schematic rear view of the present invention attached to an animal.
Figure 1:
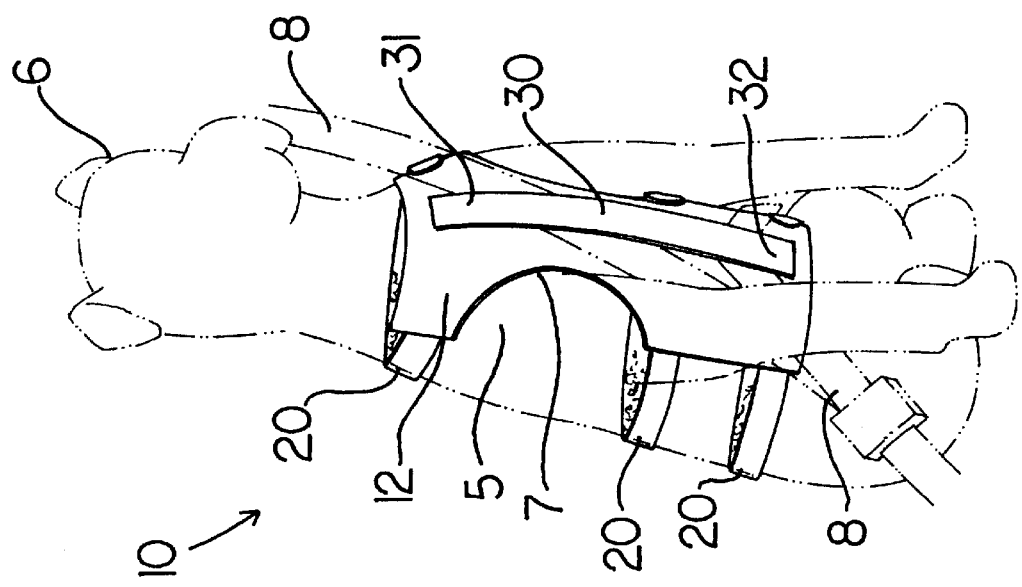
FIG. 1 is a schematic perspective view of a new animal restraint apparatus according to the present invention attached to an animal.
Figure 3:
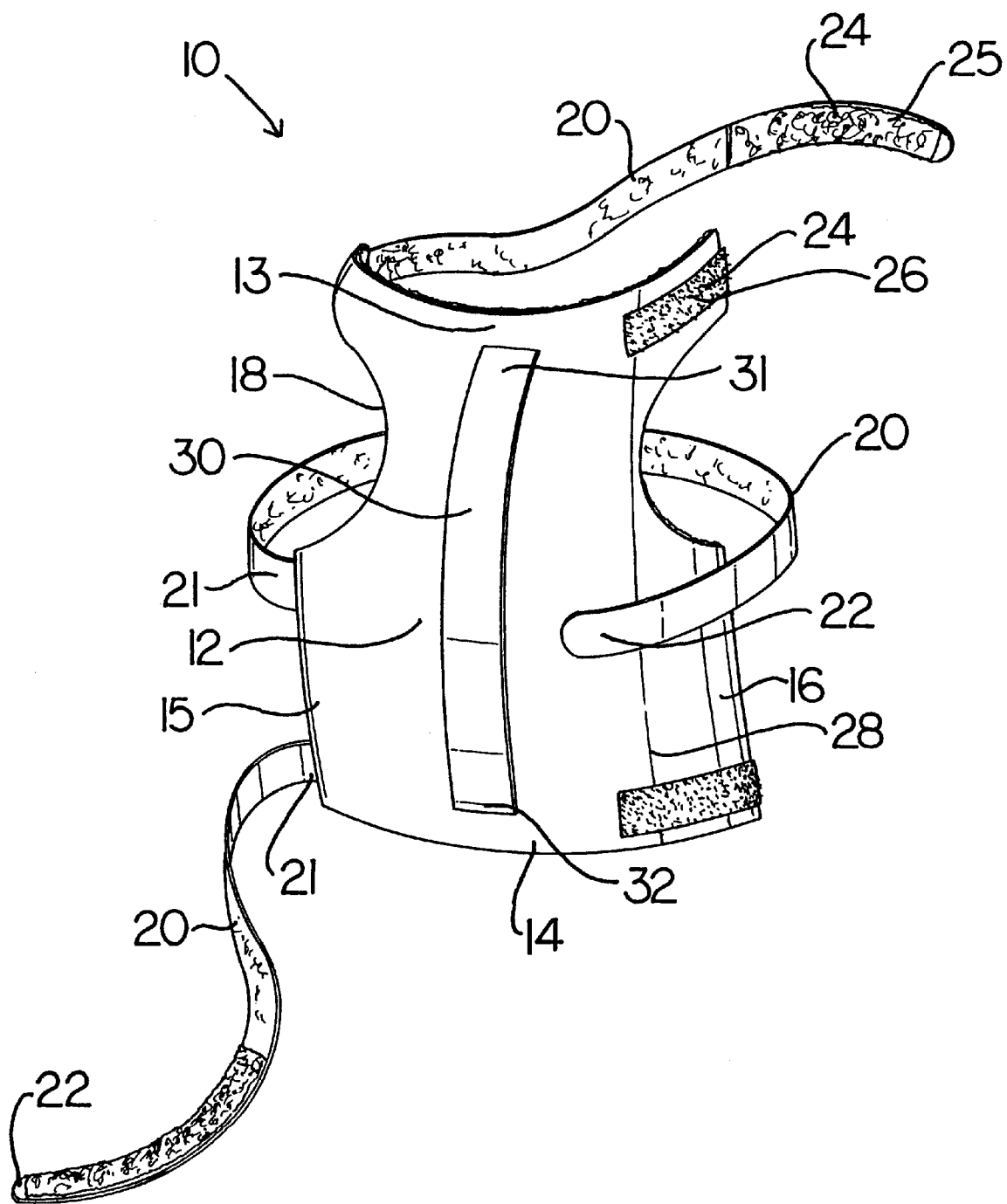
FIG. 3 is a schematic perspective view of the present invention.

With reference now to the drawings, and in particular to FIGS. 1 through 3 thereof, a new animal restraint apparatus embodying the principles and concepts of the present invention and generally designated by the reference numeral 10 will be described.

As best illustrated in FIGS. 1 through 3, the animal restraint apparatus 10 generally comprises a flexible panel member 12 that has a top end 13, a bottom end 14, a first side 15, and a second side 16.

Each of the first and second sides 15, 16 has an arcuate cutout section 18 positioned nearer the top end 13 than the bottom end 14 such that each of the sides 15, 16 conform to shoulders 5 of the pet 6 when the panel member 12 is positioned on a chest 7 of the pet 6.

Included is a plurality of elongate straps 20 for releasably attaching the panel member 12 to the chest 7 of the pet 6. Each of the straps 20 has a first end 21 and a second end 22. Each of the first ends 21 is fixedly coupled to the first side 15 of the panel member 12.

A fastening means 24 selectively couples the second ends 22 of each of the straps 20 to the second side 16 of the panel member 12.

A first portion 25 of the fastening means 24 is fixedly coupled to the second ends 22 of each of the straps 20.

A second portion 26 of the fastening means 24 is fixedly coupled to a front surface 28 of the second side 16 of the panel member 12.

The fastening means 24 comprises a hook and loop fastener.

A loop 30 for removably receiving the seatbelt 8 is attached to the panel member 12. The loop 30 has an upper end 31 and a lower end 32. The upper and lower ends 31, 32 of the loop 30 is fixedly coupled to the top and bottom ends 13, 14 of the panel member 12 respectively such that the seatbelt 8 may be passed between the loop 30 and the panel member 12 into a latched position for the purpose of securing the pet 6 in the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal restraint apparatus for releasably securing a pet to a seatbelt of a vehicle, the seatbelt having a shoulder strap portion and a waist belt portion, said apparatus comprising:

a flexible panel member having a top end, a bottom end, a first side, and a second side;

a plurality of elongate straps for releasably attaching said panel member to a chest of the pet such that said panel covers the chest of the pet extending from a base of the pet's neck in front of the pet's front legs to a position behind the pet's front legs; and a loop for removably receiving the shoulder strap portion and waist belt portion of the seatbelt such that the shoulder strap portion and waist belt portion extend through one side of said loop and out from a second side of said loop, said loop being positioned on said panel member such that the seatbelt is positioned to cross the chest of the dog when the seatbelt is inserted through said loop, said loop having a length sufficient for passing the waist belt portion of the seatbelt between front and back legs of the pet while the shoulder strap portion passes from a position in front of one front leg and behind a second front leg.

2. The animal restraint apparatus as set forth in claim 1, further comprising each of said first and second sides having an arcuate cutout section positioned nearer said top end than said bottom end such that each of said sides conform to shoulders of the pet when said panel member is positioned on the chest of the pet.

3. The animal restraint apparatus as set forth in claim 1, further comprising:

each of said straps having a first end and a second end, each of said first ends being fixedly coupled to said first side of said panel member;

a fastening means for selectively coupling said second ends of each of said straps to said second side of said panel member; and a first portion of said fastening means being fixedly coupled to said second ends of each of said straps.

4. The animal restraint apparatus as set forth in claim 3, further comprising a second portion of said fastening means being fixedly coupled to a front surface of said second side of said panel member.

5. The animal restraint apparatus as set forth in claim 3, further comprising said fastening means comprising a hook and loop fastener.

6. The animal restraint apparatus as set forth in claim 1, further comprising said loop having an upper end and a lower end.

7. The animal restraint apparatus as set forth in claim 6, further comprising said upper and lower ends of said loop being fixedly coupled to said top and bottom ends of said panel member respectively.

8. An animal restraint apparatus for releasably securing a pet to a seatbelt of a vehicle, the seatbelt having a shoulder strap portion and a waist belt portion, said apparatus comprising:

a flexible panel member having a top end, a bottom end, a first side, and a second side, each of said first and second sides having an arcuate cutout section positioned nearer said top end than said bottom end such that each of said sides conform to shoulders of the pet when said panel member is positioned on a chest of the pet, said panel being positioned such that said panel covers the chest of the pet extending from a base of the pet's neck in front of the pet's front legs to a position behind the pet's front legs;

a plurality of elongate straps for releasably attaching said panel member to the chest of the pet, each of said straps having a first end and a second end, each of said first ends being fixedly coupled to said first side of said panel member;

a fastening means for selectively coupling said second ends of each of said straps to said second side of said panel member, a first portion of said fastening means being fixedly coupled to said second ends of each of said straps, a second portion of said fastening means being fixedly coupled to a front surface of said second side of said panel member, said fastening means comprising a hook and loop fastener; and a loop for removably receiving the shoulder strap portion and waist belt portion of the seatbelt such that the shoulder strap portion and waist belt portion extend through one side of said loop and out from a second side of said loop, said loop having an upper end and a lower end, said upper and lower ends of said loop being fixedly coupled to said top and bottom ends of said panel member respectively whereby said loop is positioned on said panel member such that the seatbelt is positioned to cross the chest of the dog when the seatbelt is inserted through said loop, said loop having a length sufficient for passing the waist belt portion of the seatbelt between front and back legs of the pet while the shoulder strap portion passes from a position in front of one front leg, and behind a second front leg.

* * * * *